United States Patent
Wu

(10) Patent No.: US 9,649,941 B2
(45) Date of Patent: May 16, 2017

(54) BOOST CONVERTER DEADTIME COMPENSATION

(71) Applicant: FORD GLOBAL TECHNOLOGIES, LLC, Dearborn, MI (US)

(72) Inventor: Ji Wu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 909 days.

(21) Appl. No.: 13/939,828

(22) Filed: Jul. 11, 2013

(65) Prior Publication Data

US 2015/0015064 A1    Jan. 15, 2015

(51) Int. Cl.
*B60L 11/18* (2006.01)
*B60L 15/00* (2006.01)

(52) U.S. Cl.
CPC ......... *B60L 11/1803* (2013.01); *B60L 15/007* (2013.01); *B60L 2240/529* (2013.01); *B60L 2270/147* (2013.01); *Y02T 10/645* (2013.01); *Y02T 10/7005* (2013.01)

(58) Field of Classification Search
CPC ............... B60L 2240/529; B60L 2270/147
See application file for complete search history.

(56) References Cited

U.S. PATENT DOCUMENTS

| 5,550,450 | A | 8/1996 | Palko et al. |
| 5,712,536 | A | 1/1998 | Haas et al. |
| 5,872,710 | A | 2/1999 | Kameyama |
| 7,656,690 | B2 | 2/2010 | Yamada et al. |
| 8,467,199 | B2 * | 6/2013 | Lee ............... H02M 3/33584 363/21.02 |
| 2013/0057188 | A1 * | 3/2013 | Takamatsu ........ H02M 1/42 318/459 |

FOREIGN PATENT DOCUMENTS

KR    10-1157429 B1    6/2012

OTHER PUBLICATIONS

Oliveira et al., "Improved Dead-Time Compensation for Sinusoidal PWM Inverters Operating at High Switching Frequencies", Aug. 2007, IEEE Transaction on Industrial Electronics vol. 54, No. 4.*
Munoz et al., "On-Line Dead-Time Compensation Technique for Open-Loop PWM-VSI Drives", Jul. 1999, IEEE Transactions on Power Electronics vol. 14, No. 4.*

* cited by examiner

*Primary Examiner* — Jared Fureman
*Assistant Examiner* — Joel Barnett
(74) *Attorney, Agent, or Firm* — David B. Kelley; Brooks Kushman P.C.

(57) ABSTRACT

A hybrid powertrain system may include an electric machine, a battery back, a boost converter and at least one controller. The boost converter may include an inductor and be configured to receive input voltage from the battery back and provide an output voltage to the electric machine. The at least one controller may generate a duty cycle command for the boost converter based on a magnitude of input current to the boost converter and a magnitude of ripple associated with a current through the inductor such that for a given commanded voltage, an actual duty cycle for the boost converter changes depending on a direction of the current through the inductor to drive the output voltage to the given commanded voltage.

4 Claims, 3 Drawing Sheets

BOOST CONVERTER DEADTIME COMPENSATION

TECHNICAL FIELD

This disclosure relates to systems and methods for improving boost converter output in a hybrid powertrain.

BACKGROUND

Hybrid Electric Vehicles (HEVs) include one or more electric machines driven by inverter systems and may include an internal combustion engine. A high voltage battery is used in the electrified powertrain to supply power to the electric machines and to store energy recuperated during vehicle braking. The electric motor/generator(s) within a hybrid electric vehicle provides additional degrees of freedom in delivering the driver-demanded torque and may also be used to control the output speed of the engine.

It is known that a boost converter may be used in hybrid powertrain systems for increasing voltage to control the one or more electric machines while allowing for a reduction in the number of cells needed in the vehicle battery back. The basic principle of a boost converter consists of an input side, an output side, switches and three distinct operating states including a bottom-switch-on-state, a top-switch-on-state, and both-switches-off-state. During the bottom-switch-on-state, the bottom switch is closed resulting in a change in positive direction in the inductor current. During the top-switch-on-state, the top switch is closed and the bottom switch is opened allowing the inductor current to change direction and travel through the top switch to the output side. The switching between these two states results in higher voltage on the output side than input side. To avoid both switches turning on at the same time, a both-switches-off-state is implemented to insert a delay in time between one switch closing and the other switch opening. This delay between the switch states is called deadtime.

SUMMARY

In a first illustrative embodiment, a hybrid powertrain system may include, but is not limited to, an electric machine, a battery back, a boost converter and at least one controller. The hybrid powertrain system boost converter circuit may include an inductor allowing the circuit configuration to receive input voltage from the battery pack and provide an output voltage to the electric machine. The hybrid powertrain system may program the at least one controller to generate a duty cycle command for the boost converter based on a magnitude of input current to the boost converter and a magnitude of ripple associated with a current through the inductor such that for a given commanded voltage, an actual duty cycle for the boost converter changes depending on a direction of the current through the inductor to drive the output voltage to the given commanded voltage.

In a second illustrative embodiment, a method for deadtime compensating a duty cycle command for a boost converter. The method may include operating a response to a magnitude of input current for the boost converter being greater than a sum of a ripple current magnitude through an inductor of the boost converter and/or a predefined value correlated with the boost converter. The method may correct the duty cycle command based on a dead-time associated with the boost converter and a direction of an input current to drive an output voltage of the boost converter to a commanded value.

In a third illustrative embodiment, a vehicle may include a boost converter having an inductor, one or more transistors, diodes and a capacitor. The boost converter may be configured to receive an input voltage and provide an output voltage that is greater than the input. The vehicle may have at least one controller programmed to generate a duty cycle command for the boost converter based on a magnitude of ripple associated with a current through the inductor and a magnitude of current sufficient to reveal a polarity of the current such that for a given commanded voltage, an actual duty cycle for the boost converter increases as the current becomes positive and decreases as the current becomes negative. The controller is programmed to generate the boost converter duty cycle command to drive the output voltage to the given commanded voltage.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein.

Figure 1:
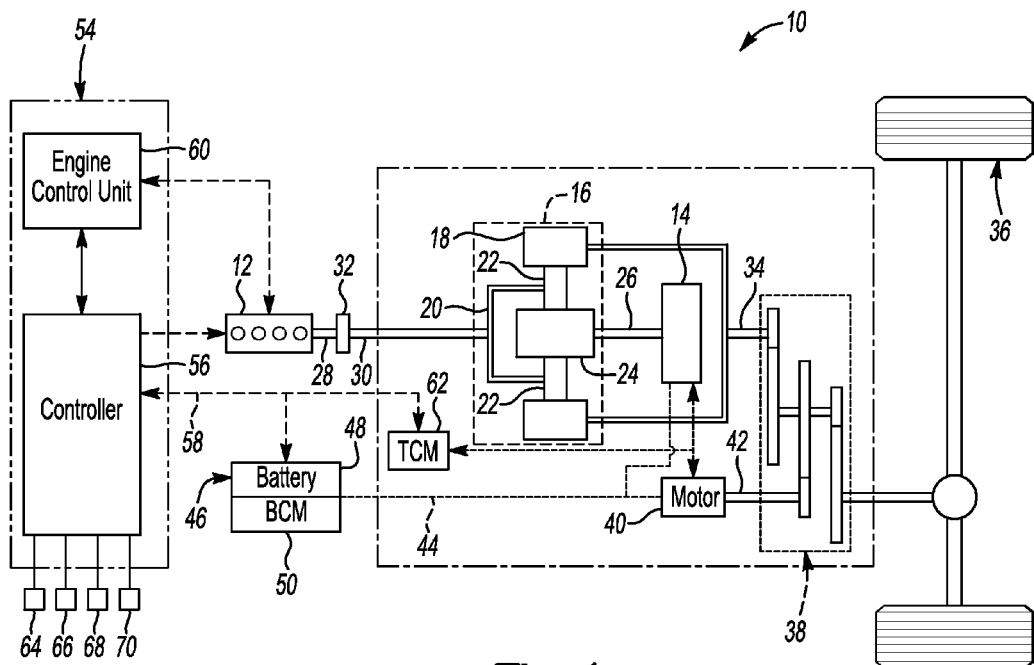
FIG. 1 is a schematic diagram of a hybrid electric vehicle (HEV)

Referring now to the drawings, FIG. 1 is a schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36 through a gear set 38.

The vehicle 10 may include a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement (i.e., the motor 40 and generator 14) can both be used as motors to output torque. Alternatively, each can also be used as a generator, outputting electrical power to a high voltage bus 44 and to an energy storage system 46, which may include a battery pack 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which like a high voltage battery is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. Although depicted as a powersplit device in FIG. 1, other HEV powertrain configurations may be employed, such as parallel or series HEVs. To control the engine 12 and components of the transmission 52 (e.g., the generator 14 and motor 40), a vehicle control module 54, such as a powertrain control module (PCM), may be provided. The control module 54 may include a vehicle system controller (VSC), shown generally as controller 56. Although it is shown as a single controller, the controller 56 may include controllers that may be used to control multiple vehicle systems. The control module 54 may include both software embedded within the controller 56 and/or separate hardware to control various vehicle systems.

A controller area network (CAN) 58 may allow the controller 56 to communicate with the transmission 52 and the BCM 50. Just as the battery 48 includes a BCM 50, other devices controlled by the controller 56 may have their own controllers. For example, an engine control unit (ECU) 60 may communicate with the controller 56 and may perform control functions on the engine 12. In addition, the transmission 52 may include a transmission control module (TCM) 62, configured to coordinate control of specific components within the transmission 52, such as the generator 14 and/or the motor 40. Some or all of these various controllers can make up a control system in accordance with the present application. Although illustrated and described in the context of the vehicle 10, which is a HEV, it is understood that embodiments of the present application may be implemented on other types of vehicles, such as a plug-in hybrid electric vehicles (PHEV) or those powered by an electric motor alone.

Also shown in FIG. 1 are simplified schematic representations of a braking system 64, an accelerator pedal 66, and a gear shifter 68. The braking system 64 may include such things as a brake pedal, position sensors, pressure sensors, or some combination thereof (not shown) as well as a mechanical connection to the vehicle wheels, such as the wheels 36, to effect friction braking. The braking system 64 may also include a regenerative braking system, wherein braking energy is captured and stored as electrical energy in the battery 48. Similarly, the accelerator pedal 66 may include one or more sensors, which like the sensors in the braking system 64, may communicate information to the controller 56, such as accelerator pedal position. The gear shifter 68 may also communicate with the controller 56. For instance, the gear shifter may include one or more sensors for communicating the gear shifter position to the controller 56. The vehicle 10 may also include a speed sensor 70 for communicating vehicle speed to the controller 56.

The engine 12 may be the sole power source in an HEV, such as vehicle 10. The battery 48 can, however, operate as an energy storage device. For instance, the battery 48 may store power from the engine 12 that has been converted into electricity by the generator 14. Further, the vehicle's kinetic energy may be transformed into electrical energy by the motor 40 during braking and stored in the battery 48. The vehicle 10 may have two sources of motive force or power: the engine 12 and the battery 48. The engine 12 may provide mechanical energy to a driveline via reaction torque provided by the generator 14. The battery 48 may provide electrical energy to the driveline through the motor 40.

The combination of energy provided to the driveline from both the engine 12 and the motor 40 may determine the amount of wheel torque ($T_w$) applied to the drive wheels 36. For instance, the amount of wheel torque ($T_w$) may be determined based on the sum of engine torque ($T_e$) and motor torque ($T_m$). While energy produced by the engine 12 and motor 40 may be described in terms of power, one of ordinary skill in the art understands that power is a function of torque and rotational speed about an axis, such as engine speed or motor speed.

The controller 56 may receive one or more inputs from a driver, such as accelerator pedal position, brake pedal position, gear shifter position and speed control inputs, or the like. Further, the controller 56 may also receive feedback signals from one or more subsystem controllers, such as the BCM 50, ECU 60, TCM 62, or the like. The driver inputs and feedback signals may be used by the controller 56 to determine the combination of engine power and motor power that may deliver improved fuel economy, emissions, performance and drivability of the vehicle 10 while maintaining state of charge (SOC) of battery 48 and hardware integrity. In doing so, the controller 56 may output control signals corresponding to engine torque, engine speed, wheel torque, or the like. These control signals output from the controller 56 may control functions and/or operating modes of the vehicle 10, such as electric-only vehicle (EV) mode, hybrid mode, engine start and stop, regenerative braking, engine speed-load operating efficiency, battery protection, or the like. As an example, an engine torque command may be sent from the controller 56 to the ECU 60 to effectuate operation of the engine 12. As another example, an engine speed command and a wheel torque command may be sent from the controller 56 to the TCM 62 to effectuate operation of the generator 14 and motor 40.

As previously described, wheel torque ($T_w$) may correspond to the amount of torque supplied to the drive wheels 36 as requested by a driver via the accelerator pedal, brake pedal and/or gear shifter. As previously mentioned, wheel torque provided to the drive wheels 36 may be produced by either the engine 12 or the motor 40 powered by the battery 48, or a combination thereof. However, fuel economy may be improved by limiting the operation of the engine 12 and, thus, the consumption of fuel. To this end, the controller 56 may attempt to maximize EV mode operation, while maintaining battery SOC, and still provide sufficient vehicle performance to meet the power demands of the driver. Accordingly, improved energy efficiency and/or fuel economy may be realized by maximizing the amount of motor torque ($T_m$) transferred from motor 40 to the drive wheels 36 to meet the driver demanded wheel torque ($T_w$).

Moreover, torque from the motor 40 to the wheels 36 may be obtained faster than torque from the engine 12. Stated differently, motor torque ($T_m$) can be generated and transferred to the drive wheels 36 more quickly than engine torque ($T_e$) can be generated and transferred to the drive wheels 36. Therefore in addition to better fuel economy, improved drivability or vehicle responsiveness to changes in wheel torque demands may be achieved by using the motor 40 to produce the requested wheel torque. At times, however, the energy available from the battery 48 to power the motor 40 may not be adequate for the motor 40 to generate sufficient motor torque to meet potential wheel torque demands requested by a driver. When this occurs, the engine 12 may be started to supplement the maximum available motor torque with engine torque to meet the driver demanded wheel torque. This may result in decreased vehicle drivability, for instance during acceleration, as the transfer of torque from the engine 12 to the drive wheels 36 in response to a driver's request may be relatively slow.

In such power limited operating conditions, conventional vehicles can raise engine speed and torque allowing a torque converter to absorb the additional energy until it is needed. An HEV, such as vehicle 10, may not include a torque converter. Accordingly, the engine power typically cannot exceed the power going to the drive wheels 36 minus the maximum allowable battery power that may be used to drive the motor 40 when the motor 40 is being operated at maximum efficiency. In particular, engine power may not be increased such that the sum of the engine power and the available battery power exceeds the requested wheel power. Limits may be placed on the battery 48, for instance, in order to maintain the battery SOC within a pre-determined range to protect the battery from under and over voltage conditions or to prevent over current conditions. As a result, the battery power available to drive the motor 40 in order to produce torque for the drive wheels 36 may be limited.

In order to improve drivability when battery limits are reached, power from the engine 12 may be reduced allowing the electric machines to provide the power being requested by a driver. In the exemplary embodiment depicted in FIG. 1, the generator 14 and the motor 40 may be two synchronous alternating current (AC) electric machines. Accordingly, each electric machine may operate at different efficiencies depending on how they are driven. Electric machine efficiency may span the range from fully efficient to fully inefficient. In a fully efficient electric machine, the maximum possible torque may be produced for a given amount of energy supplied to the machine. In contrast, all of the energy supplied to a fully inefficient electric machine may be dissipated as heat.

The power from the engine 12 may be absorbed in the generator 14 and/or motor 40 in order to improve drivability when the battery limits are reached. To this end, the motor 40 may be operated inefficiently so that engine power can be increased to exceed the wheel power minus the available battery power required to drive the motor 40 at the requested torque. Therefore, by operating the motor 40 inefficiently, engine power may be increased such that the sum of the engine power and the battery power available to drive the motor 40 exceeds the requested wheel power.

The additional engine power may be used to offset losses in the motor 40 as a result of operating inefficiently. For instance, the additional engine power may be mechanically applied to the drive wheels 36 to offset a reduction in output torque of the motor 40. The reduction in output torque of the motor 40 may be the result of decreasing motor efficiency without increasing the energy supplied to the motor 40 from the battery 48 due to battery limits having been met. Additionally or alternatively, the additional engine power may be converted into electrical energy by the generator 14 and output to the high voltage bus 44. As a result, the energy input to the motor 40 may be increased without drawing additional energy from the battery 48. Due to the inefficient operation of the motor 40, the additional energy supplied to the motor 40 from the engine 12 as result of increasing engine power may be dissipated as heat in the motor 40. Thus, the wheel torque may remain relatively constant in a limited battery condition despite the reduction in motor efficiency. For the sake of simplicity, efficient operation of the motor 40 may be referred to as "normal mode," whereas inefficient operation of the motor 40 may be referred to as "lossy mode" even though the degree of inefficiency may vary when the motor 40 is in the lossy mode.

The additional losses that can be obtained by operating the motor 40 in a lossy mode may allow for the engine 12 to operate at power levels higher than without the lossy mode. Consequently, the battery SOC may remain within set limits while wheel power demands are met. With the engine 12 contributing more system power than requested by a driver and the excessive power in the system being dissipated as heat in the motor 40, the vehicle 10 can quickly react to a driver's acceleration request by changing the efficiency of the motor 40 from inefficient to efficient, i.e., lossy mode to normal mode. The increase in motor efficiency may result in an immediate increase in output torque of the motor 40, which may be transferred relatively quickly to the drive wheels 36. Accordingly, increased acceleration may be promptly realized under both full and reduced battery limits without waiting on the engine 12.

Figure 2:
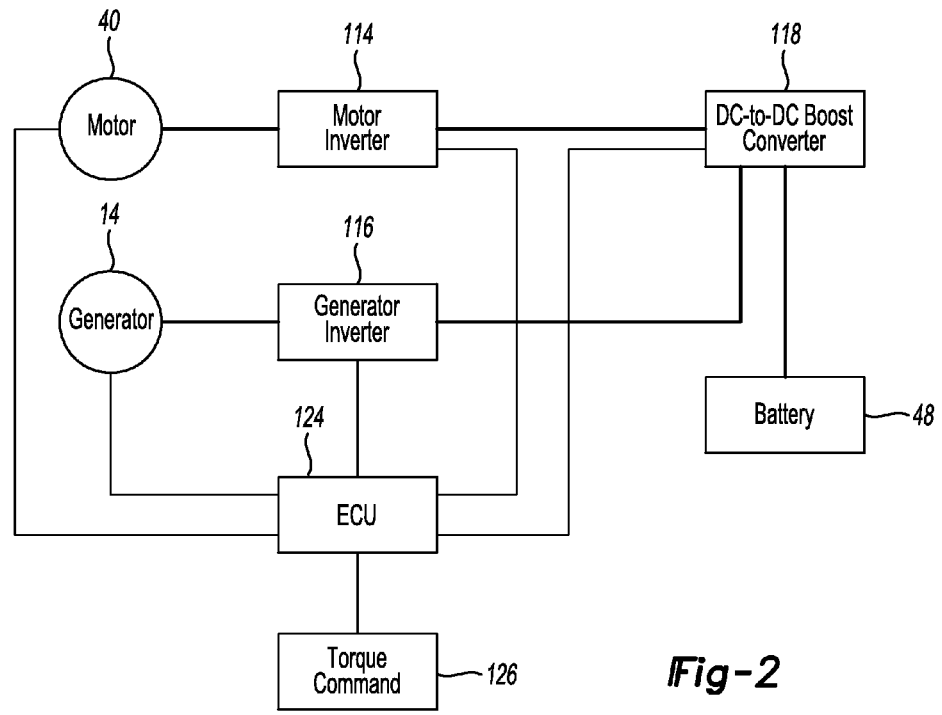
FIG. 2 is a schematic diagram of electric machines and associated power electronics and control electronics.

The example embodiment in FIG. 2 includes both a motor 40 and a generator 14. In one embodiment, motor 40 is an electric machine to which electrical energy is supplied to drive the motor to provide torque at the motor's output shaft and generator 14 is an electric machine in which electric energy is generated due to torque that is applied to a shaft of the generator. In other embodiments, motor 40 and/or generator 14 are adapted to operate as both motors and generators. Motor 40 and generator 14 are AC electric machines that are coupled to a motor AC-to-DC inverter 114 and a generator AC-to-DC inverter, respectively. In embodiments, in which motor 40 and generator 14 are DC electric machines, no such inverter is provided. Inverters 114, 116 are coupled to DC-to-DC boost inverter 118, which is in turn coupled to an electrical storage device, a battery 48. An electric control unit (ECU) 24 is provided to manage inverters 114, 116. The ECU may be a separate control module in communication with a vehicle control module and/or may be embedded with the vehicle control module including, but not limited to, a powertrain control module, hybrid control module, or a transmission control module. ECU 24 provides control outputs based on signals indicating an indication of torque demand, i.e., torque command 126, from an operator input, possibly from a human operator or another controller. Furthermore, ECU 24 receives inputs from motor 40 and generator 14 from which one or more of: speed, torque, current, voltage, etc. can be determined.

Figure 3:
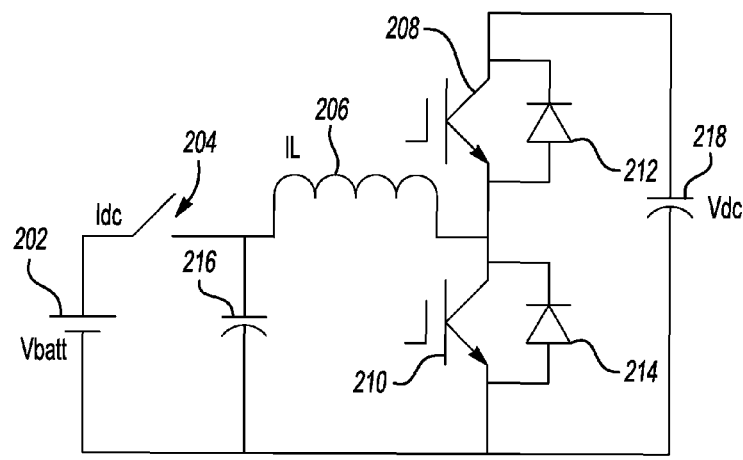
FIG. 3 is a schematic diagram of a boost converter circuit.

FIG. 3 is an illustrative embodiment of a boost converter circuit that may be implemented in a hybrid powertrain system. In a hybrid vehicle, the powertrain system may include a boost converter that may be used to provide a higher voltage for one or more electric machines. The boost converter circuit may have the following architecture, including, but not limited to, an input 202, a switch 204, an inductor 206, transistors 208 and 210, diodes 212 and 214, a capacitor 216, and an output 218.

When the switch 204 is closed, the boost converter is enabled and engaged by allowing the input 202 to flow through the circuit. The input voltage and capacitor 216 may provide the necessary current to the inductor 206. The current may flow through the upper transistor 208, or lower transistor 210 based on the switching cycle between the two transistors.

The transistors 208 and 210 may include, but are not limited to, insulated-gate bipolar transistors. The transistor(s) configuration in the boost converter circuit architecture may also be embedded with a diode 212 and 214, or have the diode 212 and 214 independently attached.

Based on the switching cycle of the transistors 212 and 214, the current alternates flow through the upper transistor 212 and lower transistor 214 to provide the higher (boosted) voltage to the output voltage 218.

For example, a boost converter circuit operating state may have a switching cycle of opening and closing the transistors to allow current flowing through the inductor to change direction, therefore changing polarity of current through the inductor. The change in current flow through the inductor causes the polarity to be reversed, and as a result the input and inductance become in series causing the input voltage and inductance voltage to be combined. The two sources in series cause a higher voltage to charge the capacitor; therefore the output may always have a voltage greater than that of the input alone.

The operating state may include control of one or more switches to allow alternate direction of current flow to an inductor, therefore causing the inductor to continuously change polarity. An example of an operating state for the boost converter circuit shown in FIG. 3 may consist of a bottom-switch-on-state, a top-switch-on-state, and both-switches-off-state. During the bottom-switch-on-state, the bottom switch is closed resulting in a change in positive direction in the inductor current. During this state, the capacitor may be able to provide the voltage and energy to the load while the diodes block any discharging through the circuit. During the top-switch-on-state, the top switch is closed and the bottom switch is opened allowing the inductor current to change direction and travel through the top switch to the output side. The switching between these two states results in higher voltage on the output side than input side. To avoid both switches turning on at the same time, a both-switches-off-state is implemented to insert a delay in time between one switch closing and the other switch opening. The switching cycle is fast enough so that the inductor may not discharge fully in between switching states.

Figure 4:
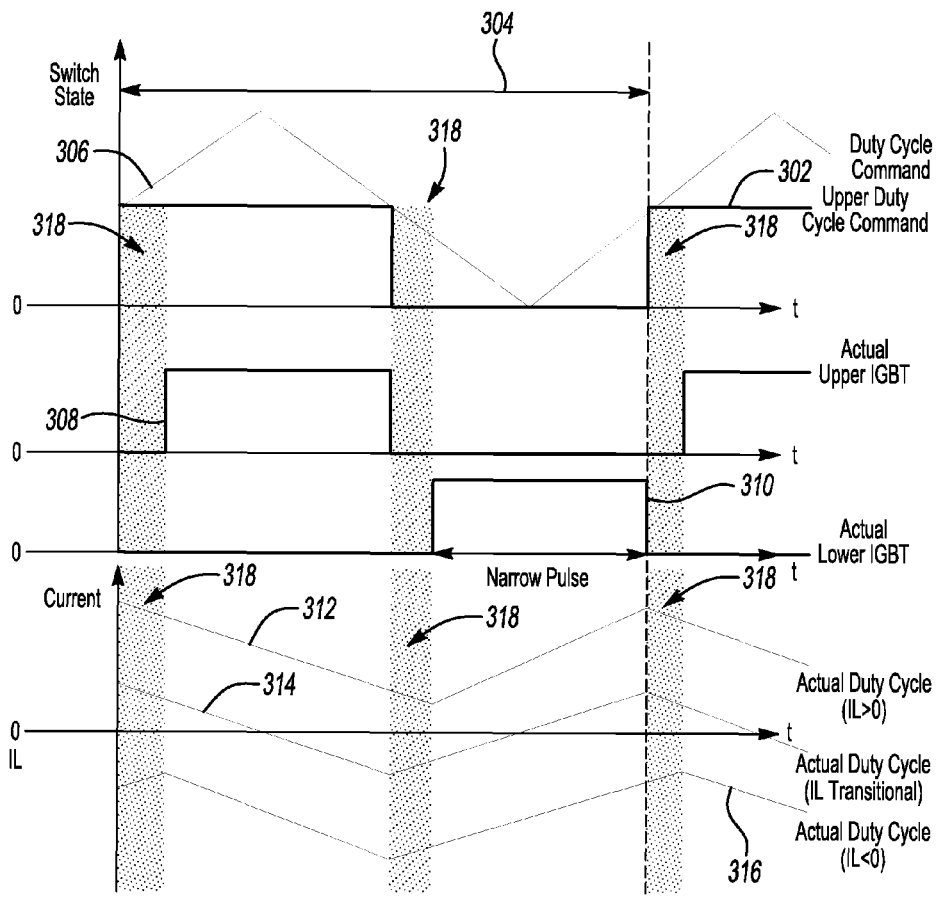
FIG. 4 is a graph of a duty cycle for a boost converter according.

FIG. 4 depicts an exemplary graph of a duty cycle for a boost converter according to one or more embodiments of the present application. The pulse width modulation (PWM) carrier waveform 306 may be generated by a control module commanding a duty cycle for the switching of one or more transistors in a boost converter circuit. An upper switch duty cycle command 302 may be a result of the PWM carrier waveform 306. The upper switch duty cycle command may be within a switching period 304 as shown in FIG. 4. The switching period 304 is a predefined amount of time that allows one or more transistors to complete a transition of turning on and off their switches by operating the boost converter based on the duty cycle command.

The upper switch duty cycle command 302 may be delayed based on the deadtime 318 between the switching states of the upper and lower transistors. The actual upper switch duty cycle 308 is less than the upper switch duty cycle command 302.

The actual lower switch state 310 may be delayed based on the deadtime 318 between the switching states of the upper and lower transistors. The actual lower switch state 310 is less than the lower duty cycle command, which is not shown. It, however, is the complement of the upper switch duty cycle command 302.

The boost converter circuit is designed so that only one transistor is on at a time during the transition cycle of turning on one transistor while turning the other off. The operation of the boost converter may cause inductor current to increase or decrease. The inductor current may increase or decrease in the boost converter depending on a duty cycle command and/or the current polarity of the inductor. The polarity of the current through the inductor may be in response to the direction of the current though the inductor during a transition between the one or more transistors in the boost converter circuit.

For example, the inductor current may cross zero 314, therefore the deadtime 318 in the transition region between the switching states may not affect boost gain. When the upper transistor switch is turned off based on the actual upper switch duty cycle 308, the inductor current is negative so diode 214 is forced to turn on causing current to increase. When the lower switch is turned off, current is positive, forcing diode 212 to turn on, causing current to decrease. In this described example, the inductor current crossing zero 314 may represent that deadtime does not have an impact to duty cycle.

In another example, when the inductor current is completely positive current 312 the effective duty cycle of the upper transistor switch 308 may be shortened by deadtime. The duty cycle for the upper switch may be reduced by the percentage of deadtime of the entire switching cycle. The inductor current continues to discharge through diode 212 until the actual lower switch duty cycle 310 turns on the lower transistor. The charging of the inductor is shortened by the narrow pulse due to the deadtime 318.

In another example, when the inductor current is completely negative current 316 the deadtime allows for extended charging of the inductor. In this described example, the inductor current completely negative 316 may represent that deadtime in the boost converter circuit does not have an impact to duty cycle.

Figure 5:
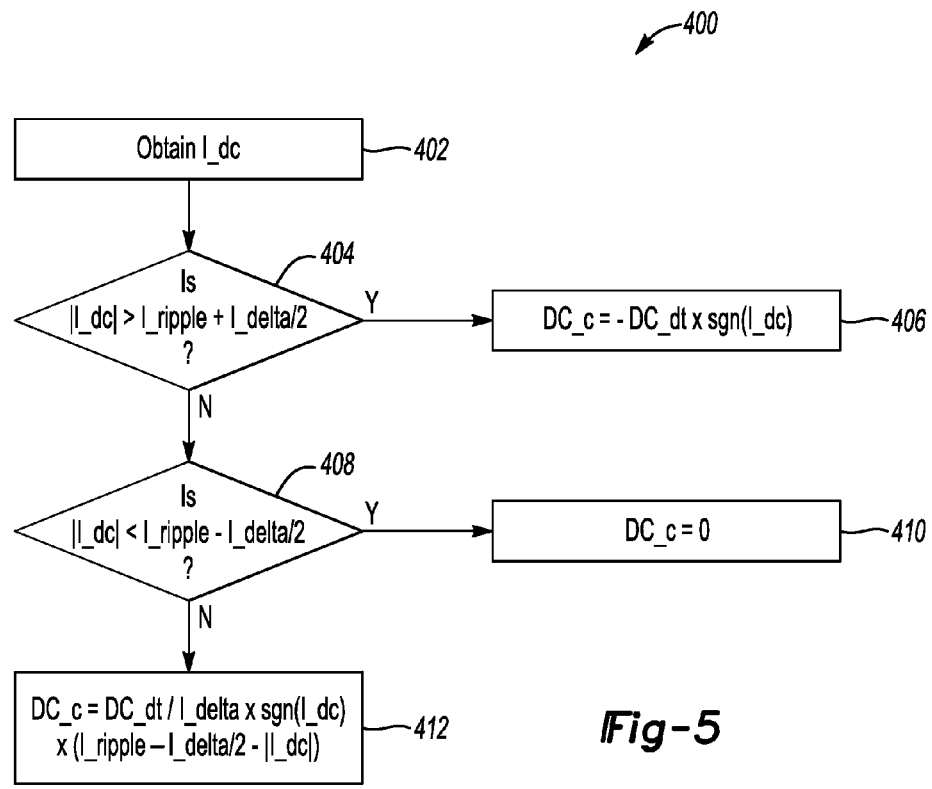
FIG. 5 is a flowchart of an algorithm for determining a corrective duty cycle for a boost converter circuit.

FIG. 5 is an exemplary flowchart depicting a method according to one or more embodiments of the present disclosure. The method is implemented using software code contained within the vehicle control module, according to one or more embodiments. In other embodiments, the method 400 is implemented in other vehicle controllers, or distributed amongst multiple vehicle controllers.

Referring again to FIG. 5, the vehicle and its components illustrated in FIGS. 1-3 are referenced throughout the discussion of the method to facilitate understanding of various aspects of the present invention. The method of controlling the boost converter in the vehicle may be implemented through a computer algorithm, machine executable code, or software instructions programmed into a suitable programmable logic device(s) of the vehicle, such as the vehicle control module, the hybrid control module, other controller in communication with vehicle computing system, or a combination thereof. Although the various steps shown in the flowchart diagram 400 appear to occur in a chronological sequence, at least some of the steps may occur in a different order, and some steps may be performed concurrently or not at all.

At step 402, the vehicle computing system may receive a measurement of the direct current (DC) from the boost converter circuit. The value of the DC current may be provided by, but not limited to, one or more current sensors located on the input of the boost converter. The value of the DC current may provide an estimation of power needed at the output of the boost converter. Once the value of the DC current has been received and the magnitude of current input to the boost converter is comprehended by the controller, the system may determine if the current value is more or less than a certain calibratable value or in between certain calibratable values.

In one illustrative embodiment, the system may obtain DC current by projecting current based on the demanded output power using the following equation:

$$\Sigma T * w / V_{inputbattery} \tag{0}$$

wherein T is torque command, w is speed of an electric machine, and $V_{inputbattery}$ is input battery voltage.

The system may check the amount of direct current (DC) value to determine if it is more or less than predefined certain value(s) or in between predefined value(s). The predefined value may be based on a magnitude of direct current sufficient to reveal a polarity of current through the inductor. The predefined certain values may include the amount of direct current needed to determine if inductor current is high enough to be considered positive. The system may determine if the DC current at the inductor is a positive value or a negative value based on the one or more sensor measurements made at the boost converter and/or several equation calculations done by a processor. At step 404, the system may determine if the duty cycle current value is greater than the sum of current ripple and a predefined calibratable value by the following equation which may include, but is not limited to:

$$|I_{DC}| > I_{ripple} + I_{\frac{delta}{2}} \tag{1}$$

wherein $|I_{DC}|$ is the absolute value of the DC current. The $I_{ripple}$ is an equation that includes:

$$I_{ripple} = DC_{desired} \times T_{switchingperiod} \times \frac{V_{output} - V_{inputbattery}}{L_{inductor}} \Big/ 2 \tag{2}$$

wherein $DC_{desired}$ is the desired duty cycle coming from a microcontroller. The $T_{switchingperiod}$ is the total amount of time it may take for an on and off cycle for one or more transistors in the boost converter circuit. The $V_{output}$ is the output voltage of the boost converter, and $V_{inputbattery}$ is the input battery voltage received by the boost converter circuit. The $L_{inductor}$ is the inductance of the boost converter inductor. The magnitude of current and a magnitude of ripple current associated with the inductor may allow the system to determine the direction of the current through the inductor while providing the system with a more accurate command of voltage/current to the boost converter circuit.

The $I_{delta}$ in equation (1) is a constant selected and/or calibrated based on the boost converter circuit design to avoid possible oscillation caused by sudden changes of the boost converter current and difference between $I_{ripple}$ and real current ripple magnitude. The $I_{delta}$ may be the predefined amount of DC current needed to determine if inductor current is high enough to be a positive or negative value. The $I_{delta}$ may be a predetermined calibrated or hard coded value in software based on the boost converter circuit and/or hybrid powertrain system design.

If the DC current is greater, the system may determine corrective duty cycle at step 406. Taking into account the greater current duty cycle, the system may determine a corrective duty cycle based on the following calculated equation:

$$\text{Corrective}_{dutycycle} = DC_{deadtime} sgn((I_{DC})) \tag{3}$$

wherein $DC_{deadtime}$ is the duty cycle deadtime which is a constant and determined by the boost converter circuit design, and $sgn(I_{DC})$ is the signum function of the measured duty cycle current. The Corrective$_{dutycyle}$ may be added to desired duty cycle $DC_{desired}$ allowing the boost converter to reduce and/or remove voltage spikes at the boost converter output.

At step 408, if the DC current is less than $$I_{ripple} + I_{\frac{delta}{2}},$$

then the system may determine if the value is negative or crossing zero using the following equation:

$$|I_{DC}| < I_{ripple} - I_{\frac{delta}{2}} \tag{4}$$

If the DC current is less than the calculated value in equation (4), then the Corrective$_{dutycyle}$ is the following calculation:

$$\text{Corrective}_{dutycyle} = 0 \tag{5}$$

therefore no correction is applied to the duty cycle, at step 410.

If the DC current is greater than the calculated value in equation (4), then the determined corrective duty cycle is calculated in the following equation:

$$\text{Corrective}_{dutycycle} = \frac{DC_{deadtime}}{I_{delta}} \times sgn(I_{DC}) \times \left(I_{ripple} - I_{\frac{delta}{2}} - |I_{DC}|\right)$$

wherein the corrective duty cycle is adjusted and applied to the boost converter to reduce and/or remove voltage spikes at the boost converter output at step 412.

Figure 6:
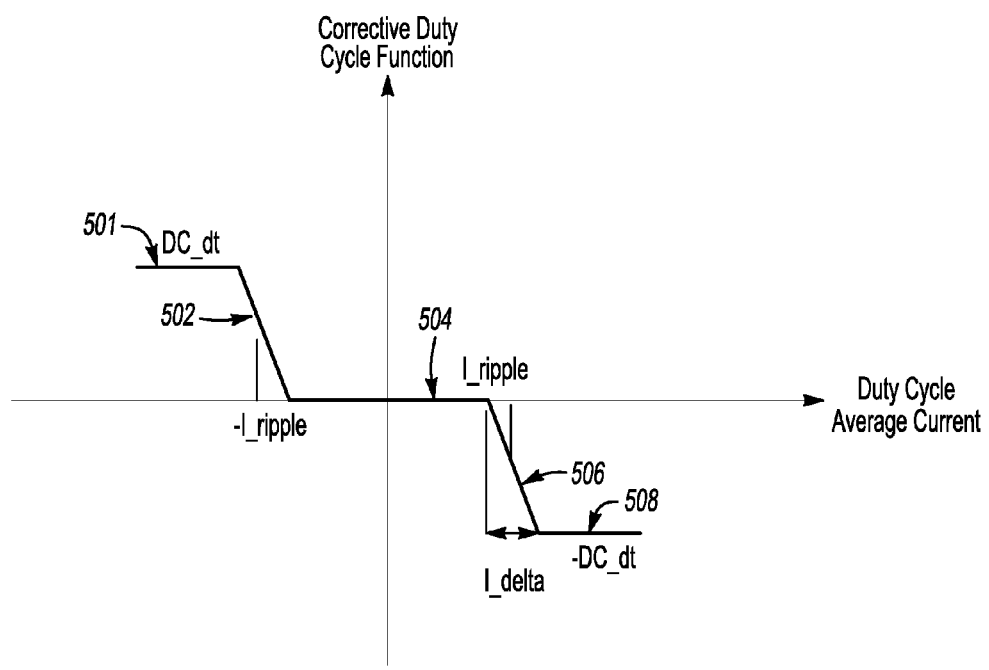
FIG. 6 is a graph of a corrective duty cycle for a boost converter.

FIG. 6 depicts an exemplary graph of a corrective duty cycle for a boost converter according to one or more embodiments of the present application. The graph depicts one or more transition regions for the duty cycle current in the boost converter in which the x-axis is the duty cycle average current and the y-axis is the corrective duty cycle function.

The positive deadtime as corrective duty cycle 501 represents the corrective duty cycle value added on top of the desired duty cycle in a transitional region for the boost converter to take into account the deadtime effect as shown by equation (3) above. In relation to the corrective duty cycle value, the actual duty cycle for the boost converter increases as the current through the inductor becomes positive. Therefore the actual duty cycle of the boost converter increases when the inductor current is positive.

The slew corrective duty cycle 502 and 506 represent the corrective duty cycle when the current value is less than $$I_{ripple} + I_{\frac{delta}{2}},$$

and greater than $$I_{ripple} - I_{\frac{delta}{2}}.$$

After determining if the current is positive or negative based on the one or more equations described above, the system may then determine corrective duty cycle ramp to smooth out the duty cycle in a transitional region. The corrective duty cycle ramp may prevent sudden changes in the duty cycle based on the corrective value calculated. The ramp allows for a smooth transition.

The corrective duty cycle is zero 504, as shown in equation (5), when the DC current is less than the calculated value in equation (4).

The negative deadtime as corrective duty cycle 508 is represented on the graph that depicts a negative corrective duty cycle added as shown by equation (3). The duty cycle command increases when the current through the inductor is negative.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
in response to a magnitude of input current for a boost converter being greater than a sum of a ripple current magnitude through an inductor of the boost converter and a predetermined value, correcting by a controller a duty cycle command for the boost converter based on a boost converter dead-time and a direction of the input current to drive an output voltage of the boost converter to a commanded value.

2. The method of claim 1 wherein the duty cycle command defines transition regions centered at the ripple current magnitude.

3. The method of claim 1 wherein the duty cycle command is corrected such that an actual duty cycle for the boost converter increases as the current through the inductor becomes positive.

4. The method of claim 1 wherein the duty cycle command is corrected such that an actual duty cycle for the boost converter decreases as the current through the inductor becomes negative.

* * * * *